May 21, 1935.　　　J. B. WATSON　　　2,001,857
LUBRICATING SYSTEM
Filed July 10, 1926
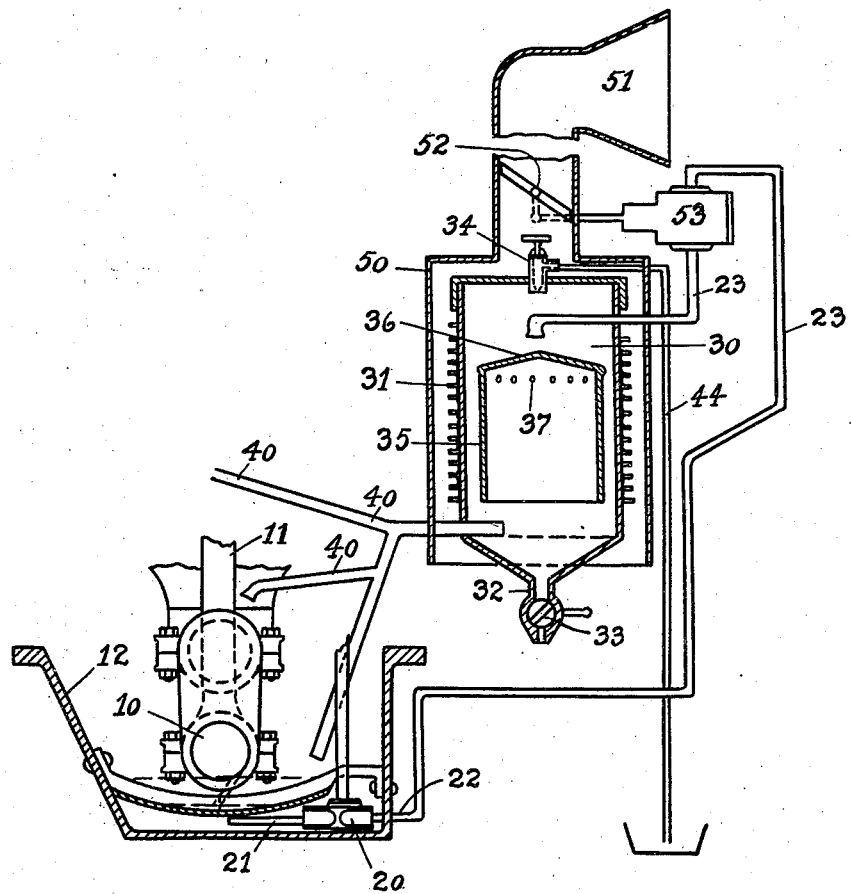
INVENTOR
JAMES BERTRAND WATSON
BY
ATTORNEY Patented May 21, 1935

2,001,857

UNITED STATES PATENT OFFICE 2,001,857

LUBRICATING SYSTEM

James Bertrand Watson, Detroit, Mich., assignor, by mesne assignments, to General Motors Corporation, Detroit, Mich., a corporation of Delaware Application July 10, 1926, Serial No. 121,606

31 Claims. (Cl. 184—6)

My invention relates to lubricating systems, more particularly to systems that are adaptable for use in automotive construction, and has for its object the production of a system that will automatically furnish complete lubrication to any and all surfaces to be lubricated, preferably at substantially constant pressure, regardless of engine speed. By complete lubrication I mean the delivery of the correct oil, applied at the right time, at the right place and in proper quantity.

A further object of my invention is to provide a system that will lubricate the moving parts by the splash system during the period of start, supply lubricant to these parts preferably under substantially constant pressure irrespective of engine speed during period of run, and continue to supply lubricant to film the surfaces requiring lubrication after the engine has been stopped so as to be ready for the next start; and said system may involve the use of both a low-pressure chamber in the form of a crankcase or splash pan and a higher pressure chamber connected therewith by a conduit in which is interposed a pump whose type, capacity, and intake position normally cause a simultaneous advance of the lubricating oil and air or other elastic fluid, in the form of bubbles, therethrough.

Lubricating systems of the well known mechanical oiler type apply a metered quantity of oil through suitable connections leading to the surfaces to be lubricated, but all these have the inherent objection of being wasteful and lack the essential of maintaining correct body (viscosity) of the lubricant which is influenced by temperature as well as admixture with fuel or other liquids. Such known systems moreover commonly have had the disadvantage that insufficient oil is delivered to the bearing surfaces during periods of start, while during periods of running, when the engine is hot, they commonly are very wasteful. My system entirely overcomes these disadvantages as will be hereinafter readily apparent.

A further object of my system is to remove water vapors, fuel vapors and to settle out all solid matter for ready removal from the lubricant and at the same time keep the lubricant at substantially constant working temperature.

The foregoing and other features of my invention will now be described in connection with the accompanying drawing in which I have diagrammatically represented my system in its preferred form, after which I shall point out in the claims those features which I believe to be new and of my own invention. In the drawing:—

The figure is a diagrammatic representation of my lubricating system as it may be applied to automotive devices.

In the drawing, the lower portion of an automobile engine is illustrated in which 10 is the crank shaft, on which the connecting rod 11 is mounted to operate in the crank case providing a splash or low-pressure chamber 12. As this detail is common to all engines, it requires no further description herein.

An oversize pump 20 is adapted normally to exhaust not only the lubricant but vapors from the crankcase, whenever said lubricant is sufficiently fluent; and said pump is preferably so connected that its suction line 21 enters the crankcase substantially at the lowest point thereof,—its delivery end 22 being shown as communicating by means of suitable conduits 23 with the top of an oil reservoir 30 serving as a separatory chamber at a higher level and/or normally under a higher pressure. In the construction shown this reservoir 30 is cylindrical and provided with fins 31 on the sides to aid in dissipation of heat, a sediment bulb 32 with a draw off valve 33 therein, and an adjustable relief valve 34. Inside the reservoir I may provide a cylindrical spreader in the form of a pipe 35 with a conical top 36, the object of which is to act as a baffle directing the oil entering the reservoir to flow towards the outer walls provided with the heat transference fins 31.

At the upper end of the pipe 35, outlets 37 are provided. From the bottom of the reservoir 30 I provide a plurality of pipe lines 40 which direct the oil to the surfaces to be lubricated, which may be located any where in the engine or chassis.

Surrounding the reservoir 30 is a shroud 50 with a ventilator in the form of a funnel 51 so disposed that a current of air will enter it when the engine is operating. In the funnel, there is located a damper 52 upon whose position depends the volume of air which passes from the funnel into the shroud and into heat exchanging relation with the walls of the reservoir 30. In the pump delivery line 23, there is located a thermostat 53 which is so connected to the damper 52 that when the temperature of the oil in the line 23 rises above a predetermined value the thermostat will move the damper toward its open position and that when the temperature of the oil in the line 23 falls below a predetermined value the thermostat will move the damper toward its closed position. Since upon the volume of air which flows through the shroud 50 depends the temperature of the oil in the reservoir 30 this mechanism will tend to maintain constant the temperature of the oil in the reservoir.

The operation of my lubricating system is as follows:—

Oil is introduced into the crank case through the usual crank case filler opening in sufficient quantity for normal operation. If at the time of starting the oil so introduced is fluid to the degree necessary to pass through the pump intake 21, the pump immediately conveys pressure to the oil reservoir 30 under pressure and the lubricant may be immediately led to the bearing surfaces through suitable leads 40, any surplus oil draining back into the crank case, completing the circuit and being repeatedly repumped to the oil reservoir. However, should the oil be of such consistency as to prevent ready passage through the pump intake, it is retained at such a level in the crank case that the crank 10 and other parts will actively stir and agitate the oil body and in doing so splash a copious supply of lubricant to all those internal engine parts which are most exposed to rapid temperature elevation, and dryness at starting, these being benefited immensely by an immediate and copious oil supply at the time of start. The thermal equivalent of the energy expended in churning and splashing this congealed oil body is immediately apparent in the lubricant,—which promptly becomes less viscous, by reason of agitation and of the temperature rise and therefore in proper condition to respond to the pump suction and is accordingly transferred to the oil reservoir as would immediately be the case were the oil fluid in the first place.

The pump 20 may be referred to as an oversize pump for the reason that it is adapted to exhaust both the lubricant and air or vapors from the crank case and is so proportioned as to pump both oil and gas or vapor in excess of the actual quantities that may be contained in the crankcase and will promptly deliver to the oil reservoir 30 all the oil that returns to the crank case from the various parts previously supplied through the leads 40.

It will be readily understood that the mentioned elastic fluids which may be admitted to the crank case, such as water vapors, fuel vapors, air, etc., are conveyed, mainly in the form of entrained bubbles, to the oil reservoir with the oil, and the excess over that required to maintain a constant pressure in the reservoir, to which the system may be adjusted, are emitted through the pressure relief valve 34. This relief valve may be piped to a drip pan or ground as shown by piping 44. It will thus be seen that oil may be maintained under a pressure in the oil reservoir 30 which is controlled by any adjustment or design of the valve 34 and that all gases or vapors in excess of the quantity required to maintain the desired pressure are blown off. This provides a pressure on the oil lines 40 which is maintained at the desired point without relation to pump or engine speed or it may be governed as desired. The emission past valve 34 or its equivalent provides a ready exit for objectionable water and fuel vapors which usually remain to condense in and contaminate the oil. It will be readily understood that the pressure of pumped elastic fluids such as air and/or vapors upon the oil in the reservoir 30 may be adjusted to suit variations in engine load (by interconnection with the throttle) or engine speed (by connection with any type of governor).

In the event that it may be desirable, the pump may be designed to hold the pressure within the crank case below atmospheric pressure thereby aiding in maintaining the undesirable vapors in the form of a gaseous body to be more readily disposed of as above provided.

The oil reservoir may be flexibly mounted in order that it may be slightly vibrated if desired so that the solid matter may be more readily deposited, at the bottom, out of circulation and ready for withdrawing from the system.

The baffle plate 36 is provided to direct the incoming oil discharged from pipe 23 toward the outside of the oil receptacle where it is exposed to heat exchange, the flow at this point being so regulated as to prevent the oil body congealing at the surface and withholding the main portion of the oil body from cooling influence.

The pipes or ducts 40 leading from the oil reservoir 30 to the parts to be lubricated enable the oil to flow, under the influence of pressure, to the surfaces while the engine is running and such flow continues for a period, under the influence of the gas pressure, after the engine is stopped; this provides for a film of lubricant on all bearing surfaces in preparation for the next start.

Where some such provision is not made there is a tendency of the films to drain off, allowing the shafts to settle firmly against the exposed metal surfaces of the bearings and freeze due to molecular interlocking, with the objectionable result that considerably more energy must be expended to again start after a period of idleness.

It will also be apparent that proper lubrication is effected with a smaller quantity of oil because of the heat transfer under control of the thermostat which may be adjustable if desirable, to suit conditions.

In my system herein disclosed the crank case becomes the main oil receptacle during the periods of rest, and during periods of start oil is splashed therefrom to the cylinders and pistons in copious quantities, until all the moving parts are filmed and the oil heated for proper passage to the pressure tank. It will be obvious that the undesirable feature of the straight splash system is thereby eliminated.

I wish it distinctly understood that my lubricating system herein described is in the preferred form in which I desire to use it but that changes or variations may be made as may be convenient or desirable without departing from the salient features of my invention and I therefore intend the following claims to cover such modifications as naturally fall within the lines of invention.

I claim:—

1. In a lubricating system, in combination with an engine provided with a crank case adapted to contain lubricant, a pressure tank provided with rapid heat transferring sides and a central storage chamber, means to exhaust the lubricant and vapors from the crank case and deliver the same under pressure to the tank, means inside the tank to direct the flow of incoming lubricant towards the heat transferring sides, means to maintain constant the pressure within the chamber, and means to convey the lubricant under pressure to the surfaces to be lubricated.

2. The device of claim 1 with the addition of means controlled by the temperature of the oil advancing to the tank to regulate the advance of a cooling fluid toward the tank.

3. An internal combustion engine comprising means for lubricating a bearing part thereof, said means including a pressure chamber, a pump for supplying lubricant and vapors from the crankcase to said chamber, means for limiting the pressure in said chamber to less than that applied to the lubricant by the pump, and a temperature regulator for said chamber.

4. An internal combustion engine comprising in combination splash means for lubricating the cylinder walls thereof under starting conditions only, and pressure means for lubricating a bearing part of the engine thereafter, said pressure means including a pressure chamber, a pump delivering thereto and driven by the engine and supplying oil and vapor to said chamber,—said chamber having a valved vapor outlet and the said oil being delivered from said chamber to said part at a pressure in excess of the maximum pressure in the crankcase.

5. An internal combustion engine comprising in combination splash means for lubricating the cylinder walls thereof substantially only under starting conditions, and pressure means for lubricating a bearing part of the engine under running conditions, said last named means including a pump driven by the engine and supplying oil at a pressure in excess of the maximum pressure in the crankcase of the engine, means for applying and regulating the pressure of an elastic fluid upon the oil supplied by the pump, and a device for regulating the temperature of said oil, whereby both viscosity and quantity of the oil delivered to said bearing part is kept relatively constant during running conditions.

6. An internal combustion engine including a crankcase and comprising in combination means for copiously lubricating the cylinder walls of said engine by splash from said crankcase under starting conditions, and a pressure system for lubricating a bearing part of the engine under running conditions at a pressure higher than the maximum pressure attained by the vapor in the crankcase of said engine, the parts being so constructed and arranged that the pressure system in its normal operation renders the splash means substantially inoperative by withdrawal of oil from said crankcase.

7. An internal combustion engine comprising in combination splash means for lubricating the cylinder walls thereof under starting conditions, a pressure system for lubricating a bearing part of the engine under running conditions at a pressure in excess of the maximum pressure attained by the vapor in the crankcase of the engine, the parts being so constructed and arranged that the pressure system in its normal operation renders the splash means substantially inoperative, said pressure means including a pump to draw off both lubricant and vapors from said crankcase and means for separating the said vapors from the lubricant.

8. In an engine lubricating system: a crankcase providing a lower chamber for a lubricating liquid; a separatory chamber normally under a pressure higher than that within said lower chamber; means for normally advancing the lubricating liquid, in a mixture with vapors from said lower chamber, whenever said liquid is sufficiently fluent; means utilizing said vapors in predetermining a pressure within said separatory chamber; and means for conducting separated lubricating liquid under pressure from said separatory chamber to bearings above said lower chamber.

9. In an engine lubricating system: a crankcase providing a lower chamber for a lubricating liquid; a separatory chamber normally under a pressure higher than that within said lower chamber; means for normally advancing the lubricating liquid, in a mixture with vapors, from said lower chamber whenever said liquid is sufficiently fluent; means utilizing said vapors in predetermining a pressure within said separatory chamber; and means for conducting separated lubricating liquid under pressure from said separatory chamber to bearings above said lower chamber,—moving parts of said engine being so shaped and positioned as to splash and otherwise agitate said lubricating liquid in said crankcase during an initial period, to render the same efficiently fluent for pumping.

10. In an engine lubricating system: a crankcase providing a lower chamber for a lubricating liquid; a separatory chamber normally under a pressure higher than that within said lower chamber; means for normally advancing the lubricating liquid, in a mixture with vapors from said lower chamber, whenever said liquid is sufficiently fluent; means utilizing said vapors in predetermining a pressure within said separatory chamber; and means for conducting separated lubricating liquid under pressure from said separatory chamber to bearings above said lower chamber,—said separatory chamber being provided with a heat-exchange wall and with internal spreading means for said liquid.

11. In an engine lubricating system: a crankcase providing a lower chamber for a lubricating liquid; a separatory chamber normally under a pressure higher than that within said lower chamber; means for normally advancing the lubricating liquid, in a mixture with vapors from said lower chamber, whenever said liquid is sufficiently fluent; means utilizing said vapors in predetermining a pressure within said separatory chamber; and means for conducting separated lubricating liquid under pressure from said separatory chamber to bearings above said lower chamber,—said separatory chamber comprising external walls which are provided with heat exchange fins and with shroud means for guiding a thermal fluid past said fins.

12. In an engine lubricating system: a crankcase providing a lower chamber for a lubricating liquid, a separatory chamber normally under a pressure higher than that within said lower chamber; means for normally advancing the lubricating liquid, in a mixture with vapors from said lower chamber, whenever said liquid is sufficiently fluent; means utilizing said vapors in predetermining a pressure within said separatory chamber; and means for conducting separated lubricating liquid under pressure from said separatory chamber to bearings above said lower chamber,—said separatory chamber comprising external walls which are provided with heat exchange fins and with shroud means for guiding a thermal fluid past said fins, and also with means for varying the admission of said thermal means to said shroud means.

13. In means suitable for use in circulating and delivering, under pressure, an engine lubricating liquid; a low-pressure chamber: a chamber normally under higher pressure than the mentioned chamber; a conduit between said chambers; means for advancing liquid through said conduit and simultaneously feeding an elastic pressure fluid to said higher pressure chamber; and means limiting and utilizing the pressure of said fluid, in the second-mentioned chamber, to advance said liquid separately to a point of use at a level which permits return flow into said first-mentioned chamber.

14. In means suitable for use in circulating and delivering, under pressure, an engine lubricating liquid; a low-pressure chamber: a chamber normally under higher pressure than the mentioned chamber; a conduit between said chambers; means for advancing liquid through said conduit and simultaneously feeding an elastic pressure fluid to said higher pressure chamber to advance said liquid separately to a point of use at a level which permits return flow into said first-mentioned chamber,—said advancing means including a pump whose type, capacity, and intake position normally cause a simultaneous advance of said liquid and pressure elastic fluid therethrough.

15. In means suitable for use in circulating and delivering, under pressure, an engine lubricating liquid: a low-pressure chamber; a chamber normally under higher pressure than the mentioned chamber; a conduit between said chambers; means for advancing liquid through said conduit and simultaneously feeding an elastic pressure fluid to said higher pressure chamber; and means limiting and utilizing the pressure of said fluid, in the second-mentioned chamber, to advance said liquid separately to a point of use at a level which permits return flow into said first-mentioned chamber,—said last-mentioned means including a vapor take-off provided with an adjustable pressure-responsive valve.

16. In means suitable for use in circulating and delivering, under pressure, an engine lubricating liquid: a low-pressure chamber; a chamber normally under higher pressure than the mentioned chamber; a conduit between said chambers; means for advancing liquid through said conduit and simultaneously feeding an elastic pressure fluid to said higher pressure chamber; and means limiting and utilizing the pressure of said fluid, in the second-mentioned chamber, to advance said liquid separately to a point of use at a level which permits return flow into said first-mentioned chamber,—one of said chambers being provided with a heat-exchange wall with a spray means and with means spreading said liquid toward said wall.

17. In means suitable for use in circulating and delivering, under pressure, an engine lubricating liquid: a low-pressure chamber; a chamber normally under higher pressure than the mentioned chamber; a conduit between said chambers; means for advancing liquid through said conduit and simultaneously feeding an elastic pressure fluid to said higher pressure chamber; and means limiting and utilizing the pressure of said fluid, in the second-mentioned chamber, to advance said liquid separately to a point of use at a level which permits return flow into said first-mentioned chamber,—said chambers being respectively provided with means for initial heating and with means for cooling said liquid.

18. A lubricating system which includes, a reservoir, means for advancing a mixture of lubricant and gas from the reservoir toward parts to be lubricated, means for removing the gas from the lubricant, for maintaining a quantity of the lubricant under super-reservoir gaseous pressure and for advancing lubricant to parts to be lubricated by virtue of the gaseous pressure.

19. A lubricating system which includes, a reservoir, means for advancing a mixture of lubricant and gas under pressure toward parts to be lubricated, means for removing the gas from the lubricant, for maintaining a quantity of the lubricant under super-reservoir gaseous pressure and for advancing lubricant to parts to be lubricated by virtue of the gaseous pressure during the operation of the first-mentioned means and for a period after the first-mentioned means has ceased operating.

20. A lubricating system which includes, a reservoir, means for advancing a mixture of lubricant and gas under pressure from the reservoir toward parts to be lubricated, means for removing the gas from the lubricant and for maintaining a quantity of the lubricant under super-reservoir gaseous pressure so that when operation of the first-mentioned means ceases the gaseous pressure on the lubricant will return it to the reservoir.

21. A lubricating system which includes, a reservoir, means for initially supplying lubricant from the reservoir to parts to be lubricated by splash, means, which during its operation renders the splash system substantially ineffective for thereafter advancing lubricant under pressure from the reservoir toward parts to be lubricated, means for maintaining a quantity of the lubricant advanced by the second-mentioned means under super-reservoir elastic pressure so that upon cessation of operation of the second-mentioned means the elastic pressure will return it to the reservoir.

22. A lubricating system which includes a reservoir, means for initially supplying lubricant from the reservoir to parts to be lubricated by splash, means which during its operation renders the splash system substantially ineffective for thereafter advancing a mixture of lubricant and gas under pressure from the reservoir toward parts to be lubricated, means for removing the gas from the lubricant advanced by the second-mentioned means and for maintaining a quantity of lubricant under super-reservoir gaseous pressure so that upon cessation of operation of the second-mentioned means the gaseous pressure will return it to the reservoir.

23. In an internal combustion engine, a reservoir from which moving parts are adapted initially to splash lubricant onto parts to be lubricated, a pump adapted thereafter to advance lubricant toward parts to be lubricated and which during normal operation withdraws lubricant from the reservoir as fast as it is deposited therein so as to render the splash system substantially ineffective.

24. In an internal combustion engine, a reservoir in which lubricant is adapted to accumulate while the engine is not operating, parts which move during the normal operation of the engine and are adapted initially to agitate the lubricant in the reservoir and supply lubricant to parts to be lubricated by splash, and a pump adapted to withdraw lubricant from the reservoir and supply it to parts to be lubricated after the lubricant has become sufficiently fluid.

25. The invention claimed in claim 24 in which the pump is adapted to remove lubricant from the reservoir at such a rate as to render the splash system substantially ineffective during normal operation of the engine.

26. A lubricating system which includes a reservoir, means for initially supplying lubricant from the reservoir to parts to be lubricated by splash, means which during its operation renders the splash system substantially ineffective for thereafter advancing a mixture of lubricant and gas under pressure from the reservoir toward parts to be lubricated, means for removing gas from the lubricant advanced by the second-mentioned means, for maintaining a quantity of lubricant under super-reservoir gaseous pressure and for advancing lubricant to parts to be lubricated by virtue of the gaseous pressure.

27. In an engine lubricating system, a crankcase adapted to contain the major portion of the lubricant supply when the lubricant is relatively thick, movable parts enclosed by the reservoir and movable through said lubricant supply to splash the same and render it less sluggish, an engine driven pump to exhaust the crankcase and reduce the lubricant level therein below the path of said movable parts, and an overflow device to receive lubricant discharged by the pump for subsequent return to the crankcase.

28. In an engine lubricating system, a crankcase adapted to contain the major portion of the lubricant supply when the lubricant is relatively thick, movable parts enclosed by the reservoir and movable through said lubricant supply to splash the same and render it less sluggish, an engine driven pump to exhaust the crankcase and reduce the lubricant level therein below the path of said movable parts, and means to temporarily store the excess lubricant removed by the pump.

29. In an internal combustion engine, a crankcase in which lubricant is adapted to accumulate while the engine is not operating, parts which move during the normal operation of the engine and are adapted initially to agitate the lubricant in the crankcase and supply lubricant to parts to be lubricated by splash, a pump adapted to withdraw lubricant from the crankcase and supply it to parts to be lubricated after the lubricant has become sufficiently fluid, and means for removing gases and vapors from the lubricant between the pump and the parts to be lubricated.

30. In an internal combustion engine, a lubricant reservoir, means operable irrespective of pressure conditions within the reservoir for withdrawing lubricant from the reservoir and advancing it toward parts to be lubricated, a reservoir between the first mentioned means and the parts to be lubricated in which gases and vapors are adapted to be separated from the lubricant and super-reservoir gaseous pressure is adapted to be applied to the lubricant to advance it toward parts to be lubricated, and means to remove gases and vapors from the second mentioned reservoir so as to regulate the gaseous pressure which is applied to the lubricant.

31. An internal combustion engine comprising, in combination: splash means for lubricating the cylinder walls thereof under starting conditions, a pressure system which is adapted during its normal operation to render the splash means substantially inoperative for lubricating a bearing part of the engine under running conditions at a pressure in excess of the maximum pressure attained by the vapor in the crankcase of the engine, said pressure means serving to draw off both lubricant and vapors from said crankcase, and means embodied in the pressure system for separating the said vapors from the lubricant.

JAS. B. WATSON.

CERTIFICATE OF CORRECTION.

Patent No. 2,001,857.            May 21, 1935.

JAMES BERTRAND WATSON.

It is hereby certified that error appears in the printed specification of the above numbered patent requiring correction as follows: Page 1, first column, line 49, after "at" insert the article a; page 2, first column, line 12, for "pressure" read the oil; and line 13, for "the oil" read pressure; and that the said Letters Patent should be read with these corrections therein that the same may conform to the record of the case in the Patent Office.

Signed and sealed this 24th day of September, A. D. 1935.

Leslie Frazer (Seal)            Acting Commissioner of Patents.

CERTIFICATE OF CORRECTION.

Patent No. 2,001,857.          May 21, 1935.

JAMES BERTRAND WATSON.

It is hereby certified that error appears in the printed specification of the above numbered patent requiring correction as follows: Page 1, first column, line 49, after "at" insert the article a; page 2, first column, line 12, for "pressure" read the oil; and line 13, for "the oil" read pressure; and that the said Letters Patent should be read with these corrections therein that the same may conform to the record of the case in the Patent Office.

Signed and sealed this 24th day of September, A. D. 1935.

Leslie Frazer (Seal)          Acting Commissioner of Patents.